Sept. 26, 1939.  W. T. BOYER  2,174,030
FASTENING DEVICE FOR AIRPLANE COWLS AND THE LIKE
Filed Sept. 1, 1938
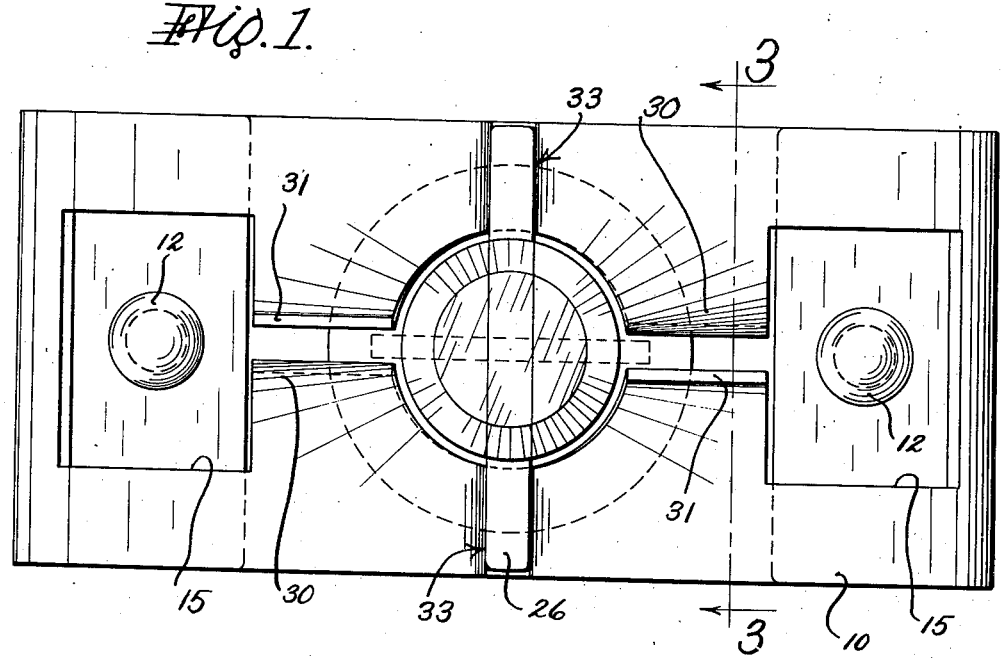
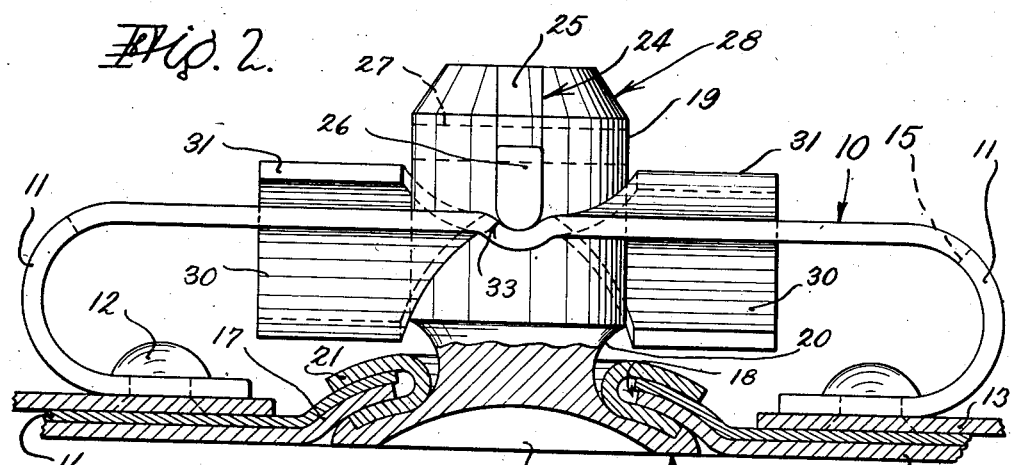
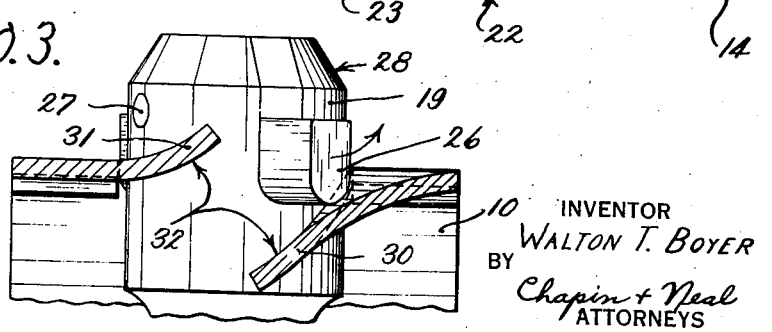
INVENTOR
WALTON T. BOYER
BY Chapin + Neal
ATTORNEYS Patented Sept. 26, 1939

2,174,030

UNITED STATES PATENT OFFICE 2,174,030

FASTENING DEVICE FOR AIRPLANE COWLS AND THE LIKE

Walton T. Boyer, Stamford, Conn.

Application September 1, 1938, Serial No. 227,946

5 Claims. (Cl. 24—221)

The invention relates to fastening devices particularly adapted to hold together metal panel members such as are used for example in airplane cowls. Particularly for the latter use there are several stringent requirements due to the stresses to which the devices are subject when in use. There is a considerable mechanical vibration due to the engine and propeller and also a vibration due to the high velocity of the air past the cowl surfaces which the devices must be capable of withstanding. The fastening devices must present a flush outer surface. They must be rapidly and easily tightened or loosened without leaving disconnected parts which might become lost.

The manner in which the fastening device of the present invention accomplishes these results will be more easily understood with reference to the accompanying drawing, in which—

Fig. 1 is an inside view of the fastener;

Fig. 2 is a side elevation thereof, partly broken away; and

Fig. 3 is a section on line 3—3 of Fig. 1.

The fastener comprises a fixed member 10 preferably of corrosion resisting spring material having a substantially flat central portion and end portions connected therewith by arcuate segments 11, and secured as by rivets 12 or welding to the metal covering of the airplane to which the cowling, hand-hole cover, or other part 14 is to be secured. The body member 10 is preferably apertured as at 15 to permit access to the head of the rivet and to increase the flexibility. The cowl piece 14 may have a lining 16 and the two laminations are bent inwardly as at 17 adjacent each hole 18 where a fastener is to be secured. Through each of these holes is passed a bolt 19 having a cannelure 20 into which a grommet 21 is formed so as to embrace the parts 14 and 16.

The external face 22 of the bolt 19 is made flush with the adjacent face of the member 14, and is formed with a screwdriver slot 23 or other suitable means by which the bolt may be rotated. Extending crosswise through a slot 24 in the inner end of the bolt is a bar 25 formed with a projecting portion 26 preferably positioned intermediate the length of the bolt. The bar 25 is held in place as by a pin or rivet 27. The end of the bolt 19 and the corresponding portion of the bar 25 are beveled as at 28 to facilitate its entry into the locking apparatus. It will be understood that once the grommet 21 is formed in place, the bolt 19 is an integral although a rotatable part of the composite member 14—16. If the bolt is in unlocked position it and the member 14—16 can be removed as a unit without the danger of the bolt becoming displaced.

The locking mechanism will now be described. It comprises besides the extensions 26 previously referred to, pairs of oppositely directed wings struck up from the material of the body member 10. One pair 30 of these wings extends downwardly while the other pair 31 extends upwardly as best shown in Fig. 3. An inclined space 32 is formed between each pair of the members 30, 31 of sufficient height to permit the passage of the extending portion 26 of the cross bar. The upstanding wings 31 might be omitted if desired, but they add somewhat to the strength of the device. If the bolt is pushed inwardly and rotated to the right the projections 26 will pass through this slot, the cross piece riding upwardly on the inclined surface of the wings 30. If this rotation is continued sufficiently the extensions 26 will ride into depressions 33 formed in the otherwise flat top of the body member 10. The sides of the extensions 26 contacting with the body member are preferably rounded as shown so that they will slide smoothly and fit snugly into the depressions 33.

In order for the extensions 26 to be held yieldingly in these depressions it is necessary that the member 10 be yieldable. In the present case this is accomplished without introducing any zone of weakness which would diminish the strength of the fastener, and particularly without requiring movement of the fixed member 10 adjacent the zones of coupling at the rivets 12 or a spring mounting for the bolt 19. It will be observed that the body member 10 is secured rigidly to the plate 13 and that the construction does not require flexibility adjacent this point, so that undesired bending which would tend to work the rivets loose is avoided. The central portion of the fixed member, however, is flat and furthermore is broken up both by the holes 15 and the slot 32. The whole inner side of the body member is therefore flexible; the bends 11 needing to yield only enough to accommodate the very slight change in overall length as the body member is bent. This avoids any local bending which might be a source of weakness when the fastener is exposed to continual vibration.

I claim:

1. A fastener for airplane cowls and the like which comprises a fixed member having a central portion and end portions spaced therefrom and in substantial parallelism therewith for rigid connection to one of the members to be fastened together, arcuate segments connecting said central portion with said end portions, said central portion having a centrally positioned aperture and having slots extending from said aperture, the fixed member having portions adjacent the slots bent towards the end portions to form inclined guides, said fixed member having depressions extending laterally of the central aperture intermediate the slots, a bolt secured for rotative movement but against longitudinal movement to the second of the members to be fastened together, a cross piece secured to said bolt and extending laterally thereof into position to pass through said slots and to be received in said depressions, the exposed end of the bolt having means whereby it may be rotated.

2. A fastener for airplane cowls and the like which comprises a fixed member having a centrally substantially flat portion and end portions spaced therefrom and in substantial parallelism therewith for rigid connection to one of the members to be fastened together, arcuate segments connecting said central portion with said end portions, said central portion having a centrally positioned aperture and having slots extending from said aperture, the fixed member having those portions adjacent the slots bent alternately toward and away from the end portions to form opposed inclined guideways between them, said fixed member having depressions extending laterally of the central aperture intermediate the slots, a bolt secured for rotative movement but against longitudinal movement to the second of the members to be fastened together, and a cross piece secured to said bolt and extending laterally thereof into position to pass through said slots and to be received in said depressions, the exposed end of the bolt having means whereby it may be rotated.

3. A fastener for airplane cowls and the like which comprises a fixed member having a central substantially flat portion and end portions spaced therefrom and in substantial parallelism therewith for rigid connection to one of the members to be fastened together, arcuate segments connecting said central portion with said end portions, said fixed member having apertures to permit access to the end portions at the point of such rigid connection and to increase the flexibility of the member, said central portion having a centrally positioned aperture and having slots extending longitudinally therefrom into said first named apertures, the fixed member having portions adjacent the slots bent towards the end portions to form inclined guides, said fixed member having depressions extending laterally of the central aperture intermediate the slots, a bolt secured for rotative movement but against longitudinal movement to the second of the members to be fastened together, and a cross piece secured to said bolt and extending laterally thereof into position to pass through said slots and to be received in said depressions, the exposed end of the bolt having means whereby it may be rotated.

4. A fastener for airplane cowls which comprises a fixed member having a central substantially flat portion and end portions spaced therefrom and in substantial parallelism therewith for rigid connection to one of the members to be fastened together, arcuate segments connecting said central portion with said end portions, said central portion having a centrally positioned aperture and having slots extending from said aperture, the fixed member having portions adjacent the slots bent towards the end portions to form inclined guides, said fixed member having depressions extending laterally of the central aperture intermediate the slots, a bolt secured for rotative movement but against longitudinal movement to the second of the members to be fastened together, and a cross piece secured to said bolt and extending laterally thereof into position to pass through said slots and to be received in said depressions, the end of the bolt remote from the cross piece having a screwdriver slot positioned in line with the direction of air flow.

5. A fastener for airplane cowls and the like which comprises a fixed member having a central substantially flat portion and end portions spaced therefrom and in substantial parallelism therewith for rigid connection to one of the members to be fastened together, arcuate segments connecting said central portion with said end portions, said central portion having a centrally positioned aperture and having slots extending from said aperture, the fixed member having portions adjacent the slots bent towards the end portions to form inclined guides, said fixed member having depressions extending laterally of the central aperture intermediate the slots, a bolt secured for rotative movement but against longitudinal movement adjacent one end to the second of the members to be fastened together and slotted at its other end, a cross piece in said slot and secured by a pin therein, said cross piece having extensions extending laterally of the bolt into position to pass through said slots and to be received in said depressions, the exposed end of the bolt having means whereby it may be rotated.

WALTON T. BOYER.